(12) United States Patent
Kao et al.

(10) Patent No.: US 7,050,696 B2
(45) Date of Patent: May 23, 2006

(54) ASSEMBLY APPARATUS FOR AN OPTICAL TRANSCEIVER

(75) Inventors: Min-Sheng Kao, Tucheng (TW); Cheng-Hung Tsai, Hsinchu Hsien (TW); Cheng-Da Shaw, Changhua Hsien (TW); Shun-Tien Lee, Hsinchuang (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 10/893,208

(22) Filed: Jul. 16, 2004

(65) Prior Publication Data

US 2005/0135775 A1    Jun. 23, 2005

(30) Foreign Application Priority Data

Dec. 19, 2003    (TW) .............................. 92136080 A

(51) Int. Cl.
 *G02B 6/00* (2006.01)
(52) U.S. Cl. ...................................... 385/147; 385/134
(58) Field of Classification Search ............ 385/88–94, 385/134–147
See application file for complete search history.

(56) References Cited

U.S. PATENT DOCUMENTS

| | | | | |
|---|---|---|---|---|
| 4,407,562 A | * | 10/1983 | Young .......................... | 385/23 |
| 4,887,882 A | * | 12/1989 | Mousseaux et al. ........... | 385/52 |
| 5,291,572 A | * | 3/1994 | Blonder et al. ................ | 385/94 |
| 5,896,481 A | * | 4/1999 | Beranek et al. ............... | 385/90 |

* cited by examiner

Primary Examiner—Michelle Connelly-Cushwa
Assistant Examiner—Rhonda S. Peace
(74) Attorney, Agent, or Firm—Wolf, Greenfield & Sacks, P.C.; James H. Morris

(57) ABSTRACT

An assembly apparatus for an optical transceiver has a positioning device and an assembly device. The assembly device has a base, a transverse adjustment mechanism adjustably mounted on the base, a clamping mechanism mounted on the transverse adjustment mechanism for clamping a control circuit board, a height adjusting mechanism adjustably mounted on the transverse adjustment mechanism, a longitudinal adjustment mechanism adjustably mounted on the height adjusting mechanism and element holding mechanism adjustably mounted on the longitudinal adjustment mechanism for holding a optical element. Accordingly, an optical transceiver can be conveniently assembled and tested with the assembly apparatus.

13 Claims, 6 Drawing Sheets

ASSEMBLY APPARATUS FOR AN OPTICAL TRANSCEIVER

BACKGROUND OF THE INVENTION

1. Field of the Invention

The present invention relates to an assembly apparatus, and more particularly to an apparatus for assembling and testing an optical transceiver simply and precisely.

2. Description of Related Art

An optical transceiver is an important element in an optical communication system and substantially comprises at least one optical element and a control circuit board. The optical element can send or receive optical signals and has contact legs that are soldered onto contact spots on the control circuit board. However, high frequency impedance increases when the length of the contact leg is longer. Therefore, a flex circuit board is used instead of the contact legs to reduce the high frequency impedance.

However, the manufacturer must hold the optical element, the flex circuit board and the control circuit board in position manually or with tools such as pliers during the soldering process. The conventional method of holding the elements of the optical transceiver during the soldering process is troublesome, and precisely aligning the solder points between the elements is also difficult.

Furthermore, the assembled optical transceiver cannot be tested immediately when conventional assembly techniques are used and must be moved to a remote apparatus for testing, which causes the conventional assembly and test process of the optical transceiver to be complex and troublesome.

To overcome the shortcomings, the present invention tends to provide an assembly apparatus to mitigate or obviate the aforementioned problems.

SUMMARY OF THE INVENTION

The main objective of the invention is to provide an assembly apparatus for an optical transceiver to simply assemble the optical transceiver and accommodate testing of the assembled optical transceiver immediately with a testing circuit board. The optical transceiver comprises a flex circuit board, a control circuit board and at least one optical element.

The assembly apparatus has a positioning device and an assembly device.

The positioning device has a positioning base, a holding plate and a biasing member. The positioning base has a holding bore to hold an optical element of the optical transceiver in place. The holding plate is mounted moveably on the positioning base and has two ends and a holding recess defined in the holding plate at the end facing the holding bore to hold the flex circuit board of the optical transceiver. The biasing member is mounted between the positioning base and the holding plate at the end opposite to the holding bore.

The assembly device has a base, a transverse adjusting mechanism, a clamping mechanism, a height adjusting mechanism, a longitudinal adjusting mechanism and an element holding mechanism. The transverse adjusting mechanism is mounted adjustably on the base along a transverse direction. The clamping mechanism is mounted on the transverse adjusting mechanism to hold the control circuit board of the optical transceiver. The height adjusting mechanism is adjustably mounted on the transverse adjusting mechanism. The longitudinal adjusting mechanism is mounted on the height adjusting mechanism. The element holding mechanism is adjustably mounted on the longitudinal adjusting device along a longitudinal direction that is perpendicular to the transverse direction to hold the optical element with the flex circuit board of the optical transceiver. With such an assembly, the elements of the optical transceiver can be held in place during a soldering process, and soldering points between the elements can be precisely aligned.

In addition, the testing circuit board can be further mounted on the assembling device such that the assembled optical transceiver can be tested immediately and conveniently.

Other objects, advantages and novel features of the invention will become more apparent from the following detailed description when taken in conjunction with the accompanying drawings.

DETAILED DESCRIPTION OF PREFERRED EMBODIMENT

Figure 1:
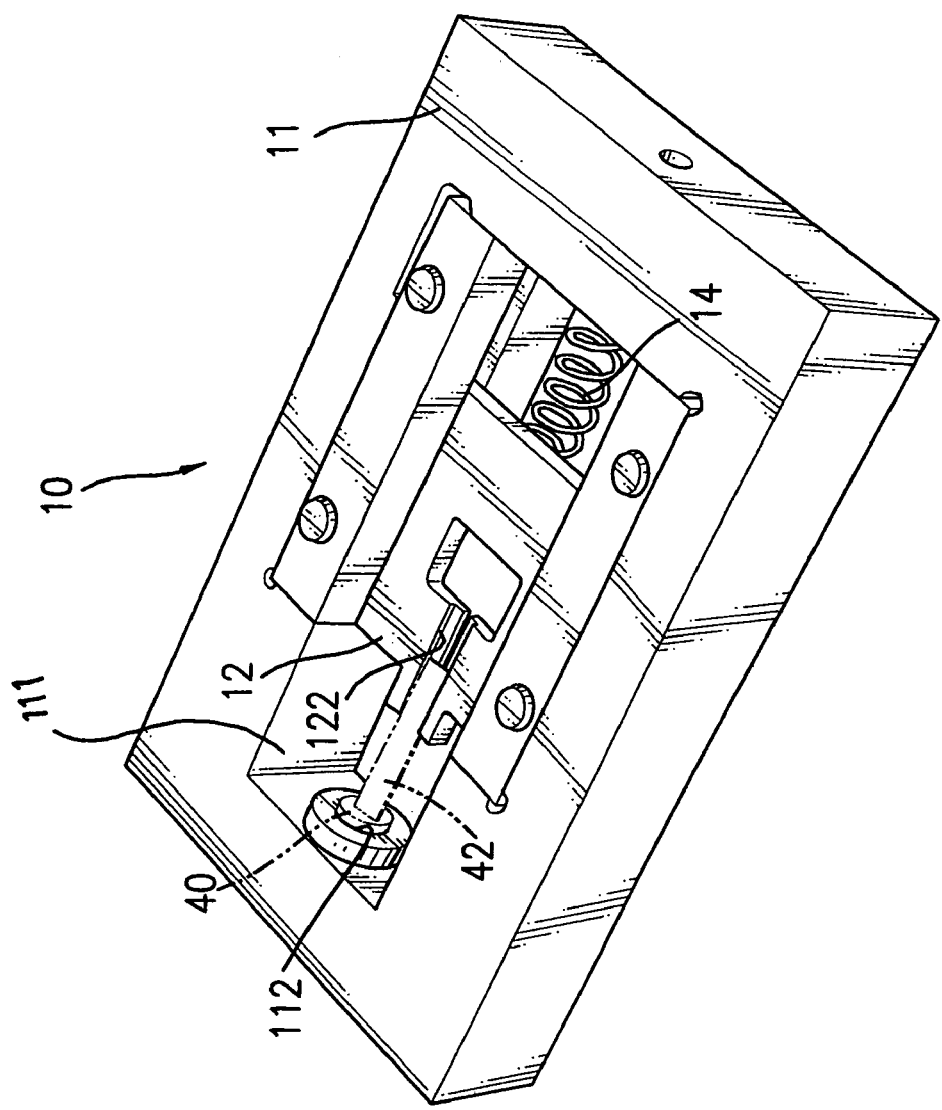
FIG. 1 is a perspective view of a positioning device of an assembly apparatus for an optical transceiver in accordance with the present invention.
Figure 3:
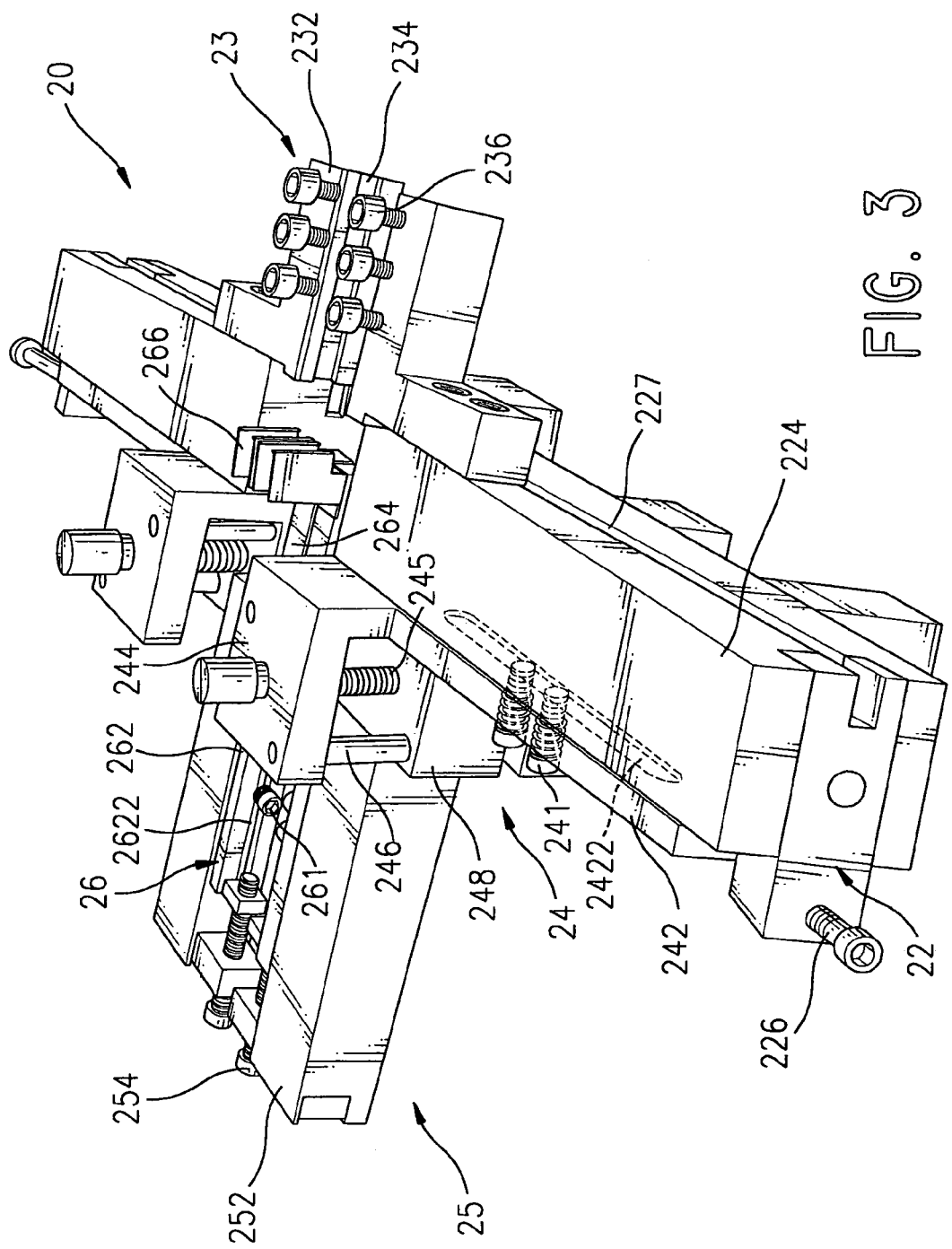
FIG. 3 is a perspective view of an assembly device of an assembly apparatus for an optical transceiver in accordance with the present invention.
Figure 4:
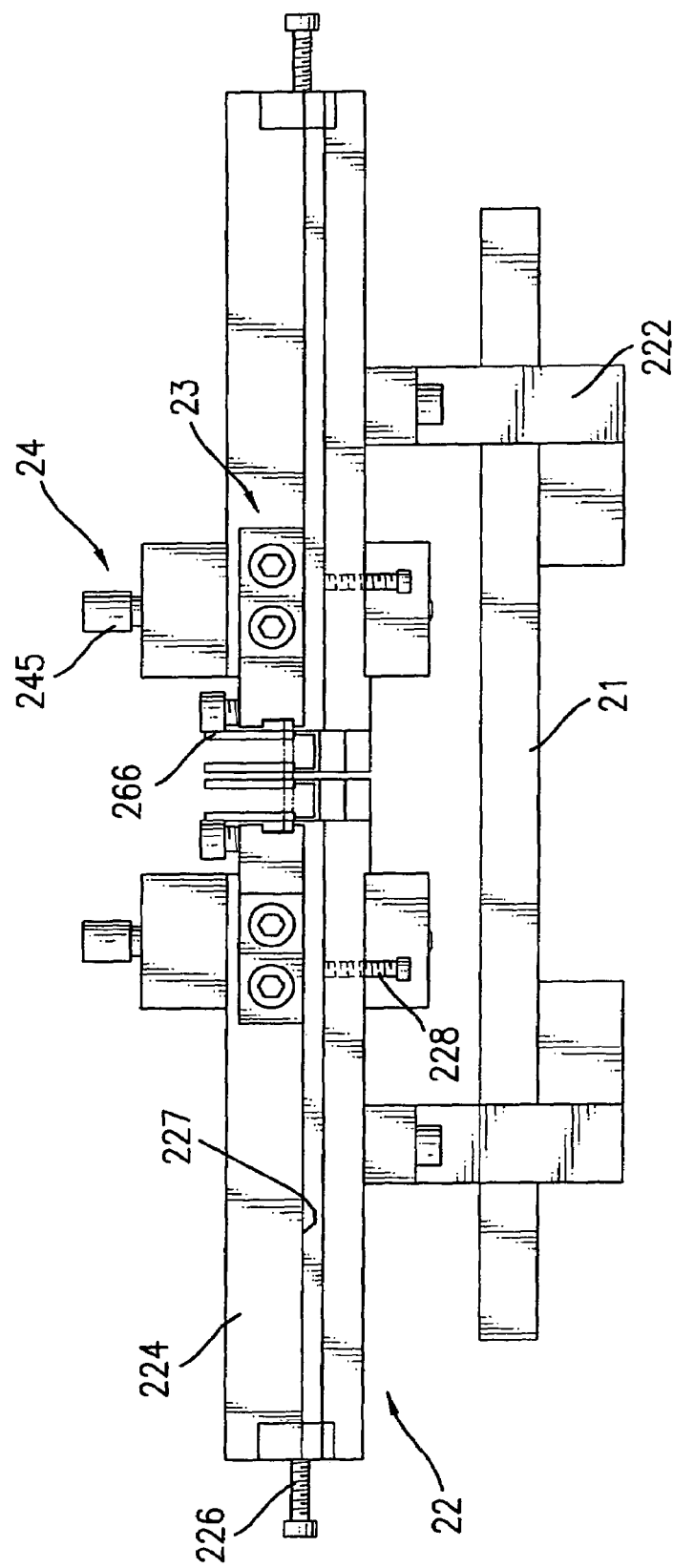
FIG. 4 is a front plan view of the assembly device in FIG. 3.
Figure 5:
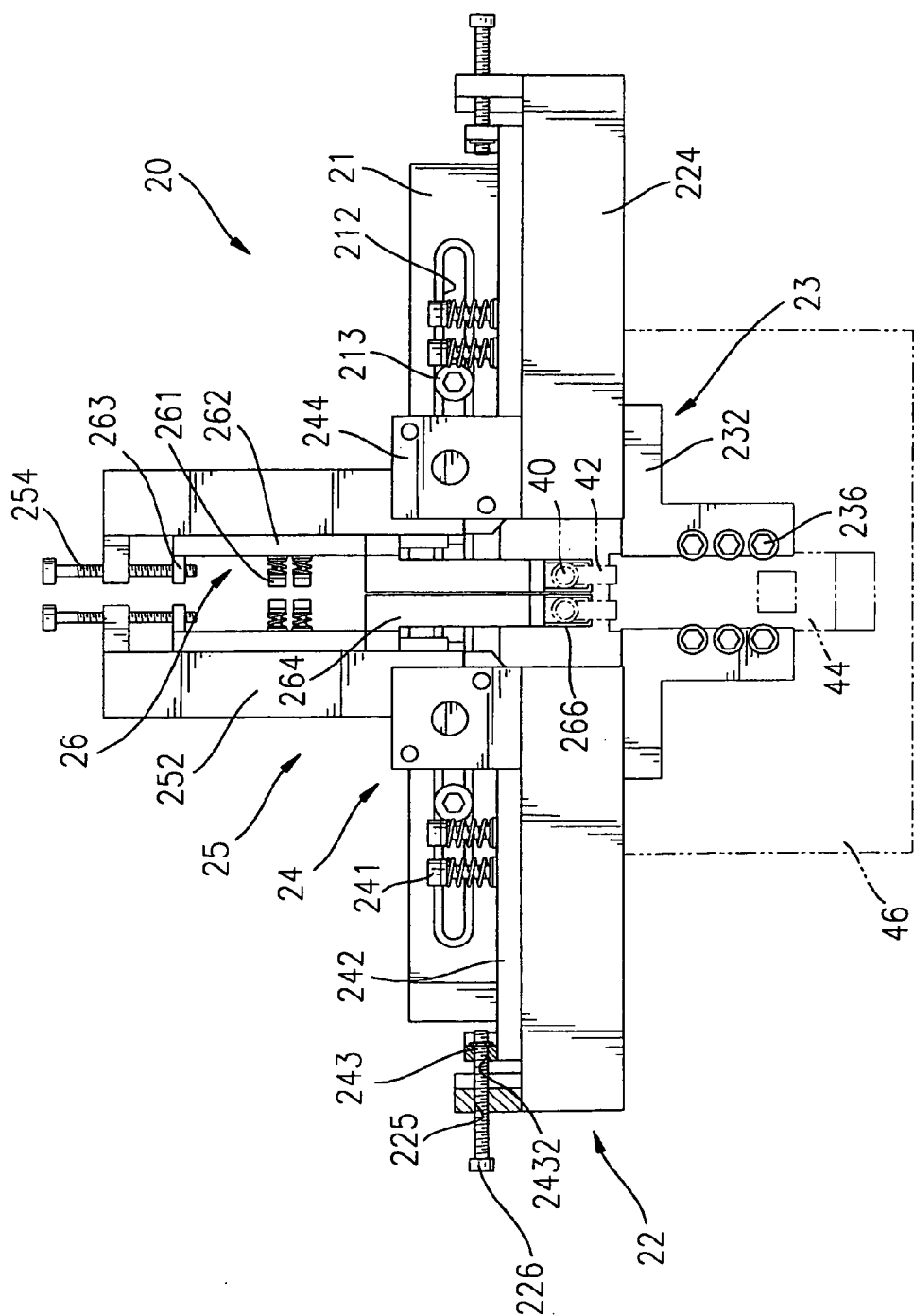
FIG. 5 is a top plan view in partial cross section of the assembly device in FIG. 3.
Figure 6:
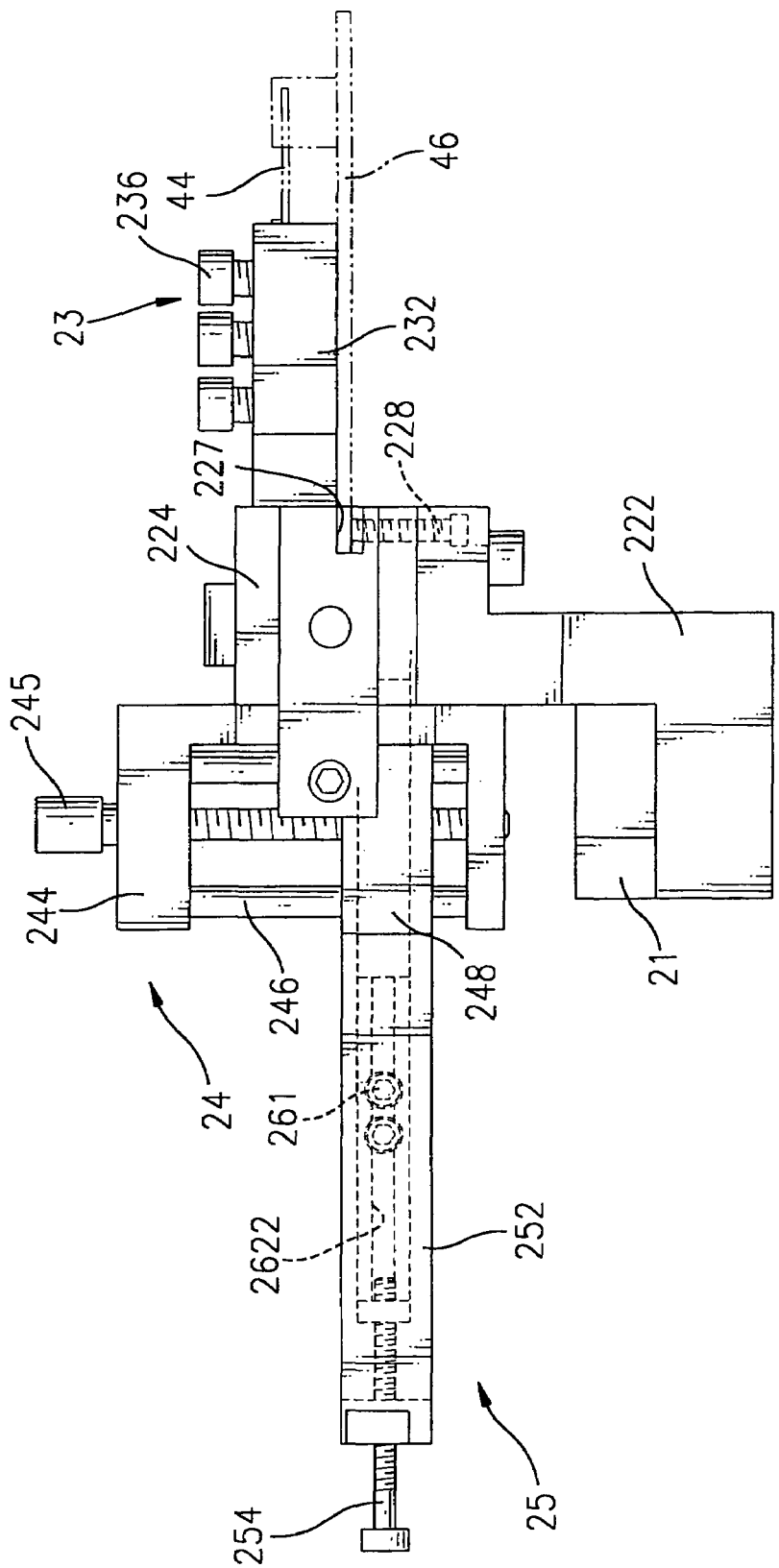
FIG. 6 is a side plan view of the assembling device in FIG. 3.

With reference to FIGS. 1 and 3, an assembly apparatus for an optical transceiver in accordance with the present invention comprises a positioning device (10) and an assembly device (20). The optical transceiver consists of a flex circuit board (42), a control circuit board (44) and an optical element (40).

Figure 2:
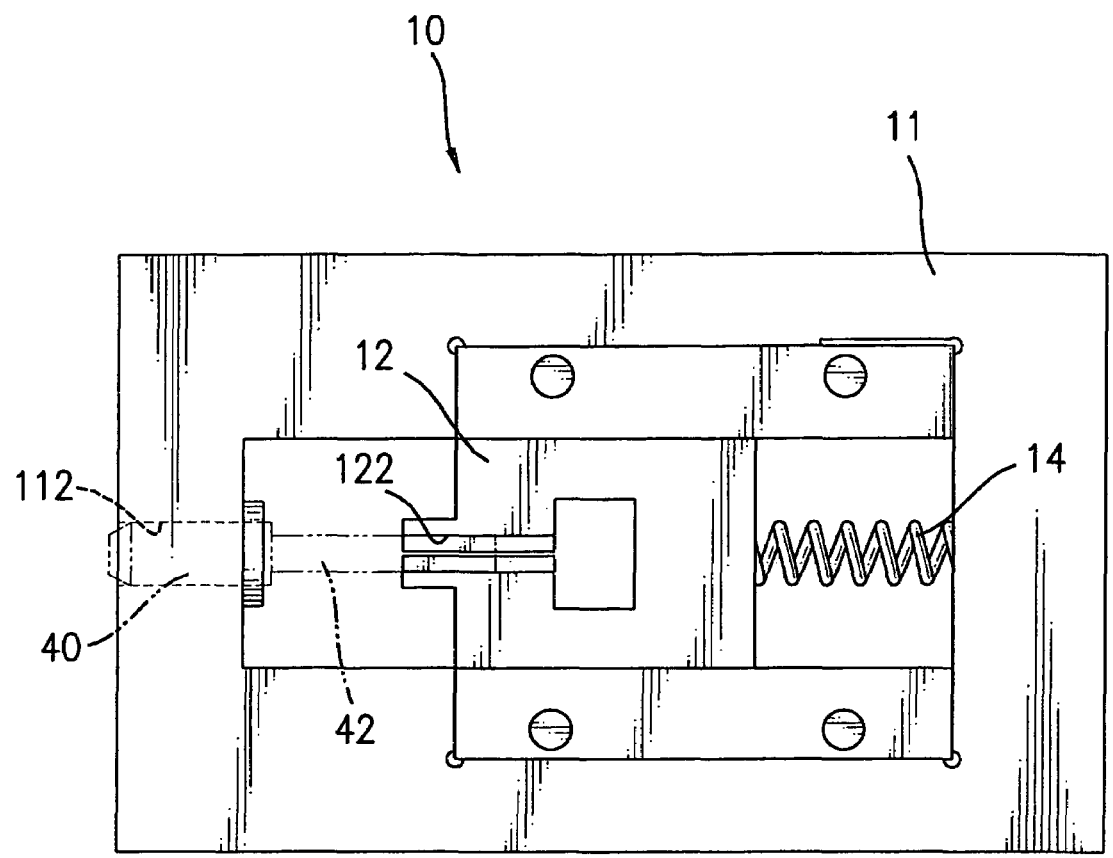
FIG. 2 is a top plan view of the positioning device in FIG. 1.

With reference to FIGS. 1 and 2, the positioning device (10) in accordance with the present invention comprises a positioning base (11), a holding plate (12) and a biasing member (14). The positioning base (11) has a cavity (111) and a holding bore (112) communicating with the cavity (111) to hold the optical element (40) of the optical transceiver in place. The holding plate (12) is mounted moveably inside the cavity (111) of the positioning base (11) and has two ends and a holding recess (122) defined in the holding plate (12) at the end facing the holding bore (112) to hold the flex circuitry board (42) of the optical transceiver. The biasing member (14) is held inside the cavity (111) and mounted between the positioning base (11) and the end of the holding plate (12) opposite to the holding bore (112).

Accordingly, an optical element (40) can be inserted into and held in the holding bore (112) in the positioning base (11), and a flex circuit board (42) is mounted in the holding recess (122) in the holding plate (12) to align with the optical element (40). Soldering points between the optical element (40) and the flex circuit board (42) will be precisely aligned, and the optical element (40) and the flex circuit board (42) can be conveniently soldered together. During the soldering process, the optical element (40) and the flex circuit board (42) do not have to be held manually or with separate tools.

With reference to FIGS. 3 to 6, the assembly device (20) holds and adjusts an assembled optical element (40) and flex circuit board (42) in a longitudinal and a transverse direction for assembly with the control circuit board (44) and subsequent testing with the testing circuit board (46). The assembly device (20) comprises a base (21), a transverse adjusting mechanism (22), a clamping mechanism (23), a height adjusting mechanism (24), a longitudinal adjusting mechanism (25) and an element holding mechanism (26).

The transverse adjusting mechanism (22) is mounted adjustably on the base (21) along the transverse direction. In a preferable embodiment, the transverse adjusting mechanism (22) comprises two supporting brackets (222) and two transverse arms (224). The supporting brackets (222) are attached to the base (21) and are adjustable in the transverse direction. The transverse arms (224) are securely attached respectively to the supporting brackets (222). In an optional embodiment, the base (21) has a slot (212) defined through the base (21) in the transverse direction. Multiple bolts (213) extend through the slot (212) in the base (21) and are screwed respectively into the supporting brackets (222) to securely hold the supporting brackets (222) in place on the base (21). When the bolts (213) are released, the supporting brackets (222) can be moved relative to the base (21) along the slot (212) so the transverse arms (224) can be moved closer together or farther apart.

The clamping mechanism (23) is mounted on the transverse adjusting mechanism (22) to hold a control circuit board (44) of the optical transceiver. In a preferable embodiment, the clamping mechanism (23) comprises two L-shaped clamping arms (232) and multiple clamping screws (236). The L-shaped clamping arms (232) are securely attached respectively to the transverse arms (224) of the transverse adjusting mechanism (22). Each clamping arm (232) has a clamping side facing the clamping side on the other clamping arm (232) and a clamping channel (234) defined in the clamping side. The clamping screws (236) are screwed respectively onto the clamping arms (232), and each clamping screw (236) has a free end extending into a corresponding clamping channel (234). Accordingly, a control circuit board (44) can be mounted between the clamping channels (234) in the clamping arms (232) and held by the clamping screws (236), such that the control circuit board (44) can be securely clamped between the clamping arms (232). In addition, adjusting the transverse arms (224) relative to each other simultaneously adjusts the clamping arms (232) relative to each other so the clamping arms (232) can hold control circuit boards with different widths.

The height adjusting mechanism (24) is mounted adjustably on the transverse adjusting mechanism (22). In a preferable embodiment, the height adjusting mechanism (24) comprises two transverse connecting arms (242), two adjusting brackets (244), two moving bases (248) and two optional adjusting devices. The transverse connecting arms (242) are adjustably attached respectively to the transverse arms (224) of the transverse adjusting mechanism (22). In an optional embodiment, each transverse connecting arm (242) has a slot (2422) defined through the transverse connecting arm (242). Multiple positioning screws (241) extend respectively through the slots (2422) in the transverse connecting arms (242) and are screwed respectively into the transverse arms (224) to hold the transverse connecting arms (242) in place on the transverse arms (224). In addition, a spring is mounted around each positioning screw (241). When the positioning screws are rotated, the transverse connecting arms (242) can be moved toward or away from each other more reliably Each optional adjusting device is mounted between one of the transverse arms (224) and a corresponding one of the transverse connecting arms (242) to adjust the distance between the transverse connecting arms (242) a small distance. Each adjusting device comprises a lug (243) and an adjusting screw (226). The lug (243) is mounted on the corresponding transverse connecting arm (242) and has a through hole (2432) defined through the lug (243). A threaded hole (225) is defined in each transverse arm (224) and aligns with the through hole (2432) in the corresponding lug (243). The adjusting screw (226) screws through the threaded hole (225) in the corresponding transverse arm (224) and extends rotatably through the aligned through hole (2432) in the lug (243) on the corresponding transverse connecting arm (242). By rotating the adjusting screws (226), the distance between the transverse connecting arms (242) will be changed at a small distance.

The adjusting brackets (244) are securely attached respectively to the transverse connecting arms (242), such that the distance between the adjusting brackets (244) is adjusted as the distance between the transverse connecting arms (242) is changed. The moving bases (248) are mounted moveably in a vertical direction perpendicular to the transverse direction respectively on the adjusting brackets (244). In a preferable embodiment, each adjusting bracket (244) is U-shaped and has an adjusting screw (245) and multiple guiding posts (246). The adjusting screw (245) is mounted rotatably on the adjusting bracket (244) and is screwed through the corresponding moving base (248). The guiding posts (246) are mounted respectively in the adjusting brackets (244) and penetrate through the corresponding moving base (248). When the adjusting screw (245) is rotated, the corresponding moving base (248) will move upward or downward. The guiding posts (246) will make the movement of the corresponding moving base (248) smooth.

The longitudinal adjusting mechanism (25) is mounted on the height adjusting mechanism (24). In a preferable embodiment, the longitudinal adjusting mechanism (25) comprises two longitudinal arms (252) securely attached respectively to the moving bases (248) of the height adjusting mechanism (24). The distance between the longitudinal arms (252) will be changed if the transverse arms (224) are moved relative to the base (21) or the transverse connecting arms (242) are moved relative to the transverse arms (224). The heights of the longitudinal arms (252) can be adjusted when the moving bases (248) move upward or downward relative to the adjusting brackets (244).

The element holding mechanism (26) is mounted adjustably on the longitudinal adjusting device (25) in a longitudinal direction and holds an optical element (40) and a flex circuit board (42) assembly of the optical transceiver. In a preferable embodiment, the element holding mechanism (26) comprises two longitudinal connecting arms (262), two element holding arms (264), two element holders (266) and two optional adjusting devices. The longitudinal connecting arms (262) are mounted adjustably and respectively on the longitudinal arms (252) of the longitudinal adjusting mechanism (25). In an optional embodiment, each longitudinal connecting arm (262) has a slot (2622) defined through the longitudinal connecting arm (262). Multiple positioning screws (261) extend respectively through the slots (2622) in the longitudinal connecting arms (262) and are screwed respectively into the longitudinal arms (252) to hold the longitudinal connecting arms (262) in place on the longitudinal arms (252). In addition, a spring is mounted around each positioning screw (261). When the positioning screws are rotated, the positions of the longitudinal connecting arms (262) relative to the longitudinal arms (252) can be adjusted more reliably.

In addition, each optional adjusting device is mounted between one of the longitudinal arms (252) and a corresponding one of the longitudinal connecting arms (262) to adjust the position of the longitudinal connecting arm (262) relative to the longitudinal arm (252) a small distance. Each adjusting device comprises a lug (263) and an adjusting screw (254). The lug (263) is mounted on the corresponding longitudinal connecting arm (263) and has a threaded hole defined through the lug (263). The adjusting screw (254) rotatably extends through the corresponding longitudinal arm (252) and screws into the threaded hole in lug (263) on the corresponding longitudinal connecting arm (262). Accordingly, the positions of the longitudinal connecting arms (262) can be slightly adjusted by rotating the adjusting screws (254).

The element holding arms (264) are securely attached respectively to the longitudinal connecting arms (262). The element holders (266) are securely attached respectively to the element holding arms (264) to hold optical elements (40) in the element holders (266).

With such an assembly device (20), an optical element (40) with a flex circuit board (42) can be held in one of the element holders (264) and a control circuit board (44) can be clamped between the clamping arms (232). Solder points between the flex circuit board (42) and the control circuit board (44) can be precisely aligned by adjusting the positions of the transverse adjusting mechanism (22), the height adjusting mechanism (24), the longitudinal adjusting mechanism (25) and the element holding mechanism (26). To hold elements of an optical transceiver manually or with tools during the soldering process is unnecessary, such that assembling an optical transceiver is convenient and rapid.

In addition, each transverse arm (224) may further have a positioning channel (227) defined in a side facing the clamping mechanism (23). Multiple positioning screws (228) are screwed respectively onto the transverse arms (224), and each has a free end extending into a corresponding positioning channels (227).

With the positioning channels (227) in the transverse arms (224), a testing circuit board (46) that has a circuit for testing the operation of the optical transceiver can be mounted in the positioning channels (227) with the positioning screws (228). Consequently, the assembled optical transceiver can be immediately and conveniently tested on the assembled device (20).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An assembly device of an assembly apparatus for an optical transceiver having a flex circuit board, a control circuit board and at least one optical element to hold and adjust the assembled optical element and flex circuit board in a longitudinal a transverse direction, the assembly device comprising:
    a base;
    a transverse adjusting mechanism adjustably connected to the base in a transverse direction;
    a clamping mechanism connected to the transverse adjusting mechanism to hold a control circuit board of the optical transceiver;
    a height adjusting mechanism adjustable connected to the transverse adjusting mechanism;
    a longitudinal adjusting mechanism connected to the height adjusting mechanism; and
    an element holding mechanism adjustably connected to the longitudinal adjusting device in a longitudinal direction to hold the assembled optical element and flex circuit board.

2. The assembly device as claimed in claim 1, wherein the transverse adjusting mechanism comprises:
    two supporting brackets connected to the base and adjustable in the transverse direction; and
    two transverse arms securely connected respectively to the supporting brackets.

3. The assembly device as claimed in claim 2, wherein the base has a slot define through the base in the transverse direction; and
    multiple bolts extend through the slot in the base and are screwed respectively into the supporting brackets to securely hold the supporting brackets in place on the base.

4. The assembly device as claimed in claim 2, wherein the clamping mechanism comprises:
    two L-shaped clamping arms securely connected respectively to the transverse arms of the transverse adjusting mechanism and each having a clamping side facing each other and a clamping channel defined in the clamping side; and
    multiple clamping screws screwed respectively onto the clamping arms and each having a free end extending into a corresponding clamping channel.

5. The assembly device as claimed in claim 2, wherein the height adjusting mechanism comprises:
    two transverse connecting arms adjustably connected respectively to the transverse arms of the transverse adjusting mechanism;
    two adjusting brackets securely connected respectively to the transverse connecting arms; and
    two moving bases moveably connected respectively to the adjusting brackets in a vertical direction.

6. The assembly device as claimed in claim 5, wherein each transverse connecting arm has a slot defined through the transverse connecting arm; and
    multiple positioning screws extend respectively through the slots in the transverse connecting arms and are screwed respectively into the transverse arms to hold the transverse connecting arms in place on the transverse adjusting arms.

7. The assembly device as claimed in claim 6 further comprising an adjusting device connected between each respective transverse arm and a corresponding one of the transverse connecting arms, and the adjusting device comprising
    a lug connected to the corresponding transverse connecting arm and having a through hold defined through the lug; and
    an adjusting screw screwing through the corresponding transverse arm and extending rotatably through the through hole in the lug on the corresponding transverse connecting arm.

8. The assembly device as claimed in claim 5, wherein each adjusting bracket is U-shaped and has an adjusting screw rotatably connected to the adjusting bracket and screwed through a corresponding moving base; and multiple guiding posts connected to the adjusting brackets and penetrating through the corresponding moving base.

9. The assembly device as claimed in claim 5, wherein the longitudinal adjusting mechanism comprises two longitudinal arms securely connected respectively to the moving bases of the height adjusting mechanism.

10. The assembly device as claimed in claim 9, wherein the element holding mechanism comprises:

two longitudinal connecting arms adjustably connected respectively to the longitudinal arms of the longitudinal adjusting mechanism;

two element holding arms securely connected respectively to the longitudinal connecting arms; and two element holders securely connected respectively to the element holding arms to hold optical elements in the element holders.

11. The assembly device as claimed in claim 10, wherein each longitudinal connecting arm has a slot defined through the longitudinal connecting arm; and multiple positioning screws extend respectively through the slots in the longitudinal connecting arms and are screwed respectively into the longitudinal arms to hold the longitudinal connecting arms in place on the longitudinal arms.

12. The assembly device as claimed in claim 10, wherein each transverse arm has a positioning channel defined at a side facing the clamping mechanism; and multiple positioning screws screwed respectively onto the transverse arms and each having a free end extending into a corresponding positioning channel.

13. The assembly device as claimed in claim 10 further comprising an adjusting device connected between each respective longitudinal arm and a corresponding longitudinal connecting arm, and the adjusting device comprising a lug connected to the corresponding longitudinal connecting arm and having a threaded hole defined through the lug; and an adjusting screw rotatably extending through the corresponding longitudinal arm and screwed into the threaded hole in the lug on the corresponding longitudinal connecting arm.

* * * * *